United States Patent [19]

Saito et al.

[11] Patent Number: 4,681,636

[45] Date of Patent: Jul. 21, 1987

[54] BONDING PRIMER COMPOSITION

[75] Inventors: Masayuki Saito, Ichihara; Mitsuo Hamada, Kisarazu, both of Japan

[73] Assignee: Toray Silicone Co., Ltd., Tokyo, Japan

[21] Appl. No.: 865,506

[22] Filed: May 21, 1986

[30] Foreign Application Priority Data

Jun. 3, 1985 [JP] Japan .................. 60-120231

[51] Int. Cl.$^4$ .................. C09K 3/00; B32B 9/00
[52] U.S. Cl. .................. 106/287.15; 106/287.16; 428/429
[58] Field of Search .................. 106/287.16, 287.24, 106/287.15; 428/429; 556/463; 528/24

[56] References Cited

U.S. PATENT DOCUMENTS

| | | | |
|---|---|---|---|
| 3,334,067 | 8/1967 | Weyenberg | 528/901 |
| 3,663,282 | 5/1972 | Smith | 106/287.19 |
| 3,708,467 | 1/1973 | Smith et al. | 528/901 |
| 3,856,606 | 12/1974 | Fan | 556/463 |
| 3,960,800 | 6/1976 | Kohl | 106/287.19 |
| 4,534,815 | 8/1985 | Hamada et al. | 106/287.11 |
| 4,618,389 | 10/1986 | Agoda | 106/287.16 |

FOREIGN PATENT DOCUMENTS 837650 3/1970 Canada .
35530 11/1975 Japan .

*Primary Examiner*—Theodore Morris
*Attorney, Agent, or Firm*—Robert Spector

[57] ABSTRACT

The novel primer compositions of this invention comprise (1) a silane containing at least one t-butyl peroxy group and no silicon-bonded ethylenically unsaturated hydrocarbon radicals, (2) an organosilicon compound containing at least two alkoxy groups and at least one addition- or condensation reactive functional group per molecule, (3) an organotitanate ester and (4) sufficient organic solvent to achieve a solution of the desired viscosity. These compositions cohesively bond silicone rubber, particularly fluorosilicone rubber, to a variety of substrates.

5 Claims, No Drawings

BONDING PRIMER COMPOSITION

BACKGROUND OF THE INVENTION

1. Field of the Invention

This invention relates to primer compositions. More particularly, this invention relates to a primer composition that cohesively bonds a silicone rubber, especially a fluorosilicone rubber, to the surface of various substrates, including metals.

2. Description of the Prior Art

Primers have heretofore been required to cohesively bond or coat materials, including polyolefins, polyamides, organic rubbers such as EPDM and DPR, and silicone rubbers, to the surface of glasses, metal oxides and metals. Canadian Pat. No. 837,650 describes vinyltris(t-butylperoxy)silane as an example of a primer employing an organoperoxide. This primer is less than satisfactory due to the requirement for hot pressing at an elevated temperature for an extended period of time. Also, the adhesion with a variety of bonding agents is inadequate. For this reason, several methods for improving this primer have been proposed.

One such method is disclosed in Japanese Pat. No. 75/35530, which discloses a primer composition containing vinyltris(t-butylperoxy)silane, an organoperoxide with a half-life of 1 minute at from 130° to 190° C., and an inert organic solvent. Hot pressing is accomplished at lower temperatures in a shorter period of time then required in the aforementioned Canadian patent, however, this composition does not provide adequate bonding for adherends such as silicone rubber and particularly fluorosilicone rubbers.

The preceding shortcomings are rectified by the present inventors' invention described in U.S. Pat. No. 4,534,815, which issued on Aug. 13, 1985. This patent teaches using primer composition containing an alkoxy group-containing organosilicon compound, vinyltris(t-butylperoxy)silane and an organic solvent to bond silicone rubber to substrates and, in particular, to achieve good bonding between fluorosilicone rubbers and substrates.

Compounds wherein the vinyl radical of vinyltris(t-butylperoxy)silane is replaced with a saturated hydrocarbon radical generally provide poor bonding for silicone rubbers compared with vinyltris(t-butylperoxy)silane. These compounds have therefore been used heretofore in the silicone rubber industry.

An objective of the present invention is to provide a primer for cohesively bonding silicone rubbers, particularly fluorosilicone rubbers, to substrates. A second objective is to provide a primer having an extended life, excellent bonding properties following a short period of heating or hot pressing at relatively low temperatures, optionally under pressure, and no odor emission in order to avoid adversely affecting the working environment.

SUMMARY OF THE INVENTION

It was discovered that the combination of an organoperoxy-substituted silane with saturated hydrocarbon radicals, an alkoxy substituted organosilicon compound and an organotitanate ester unexpectedly improved the bonding of silicone rubbers.

DETAILED DESCRIPTION OF THE INVENTION

This invention provides a primer composition for bonding a silicone rubber composition to a substrate, said composition comprising A. 100 parts by weight of a silane of the formula $$R_nSi[OOC(CH_3)_3]_{4-n}$$

where R represents a monovalent hydrocarbon radical or a substituted monovalent hydrocarbon radical, R is other than alkenyl and n is 1, 2 or 3; B. from 5 to 500 parts by weight of an organosilicon compound containing at least two alkoxy groups per molecule and at least one unit corresponding to the average formula $$R^1{}_aR^2{}_b(OR^3)_cSiO_{(4-a-b-c)/2}$$

where $R^1$ represents a hydrocarbon radical selected from the same group as R but exclusive of $R^2$, $R^2$ represents a monovalent radical containing an addition reactive or condensation reactive functional group, $R^3$ represents an alkyl, aryl or alkoxyalkyl group, the value of a is from 0 to 3, inclusive, the value of b is from 0 to 3, inclusive, the value of c is greater than 0 and no greater than 4 and the sum of a+b+c is greater than 0 and no greater than 4;

C. from 0.1 to 50 parts by weight of an organotitanate ester; and

D. an organic liquid in an amount sufficient to solubilize said primer composition.

Ingredient (A) of the present compositions, an organosilicon compound having at least 1 silicon-bonded t-butylperoxy group in each molecule is the important one for providing adhesive properties. The adhesive properties are further increased by the addition of ingredients (B) and (C).

Ingredient (A) is represented by the general formula $R_nSi[OOC(CH_3)_3]_{4-n}$. In this formula R represents a substituted or unsubstituted monovalent hydrocarbon radical other than alkenyl. Specific examples of R include, but are not limited to, alkyl radicals such as methyl, ethyl and propyl; aryl radicals such as phenyl; and these radicals in which hydrogen has been substituted by halogen. The number of R radicals per molecule, represented by n, is 1, 2 or 3. Specific examples of ingredient (A) include methyltri(t-butylperoxy)silane, ethyltri(t-butylperoxy)silane, butyltri(t-butylperoxy)silane, dimethyldi(t-butylperoxy)silane, diethyldi(t-butylperoxy)silane, methylethyldi(t-butylperoxy)silane, methylbutyldi(t-butylperoxi)silane, ethylbutyldi(t-butylperoxy)silane, trimethyl(t-butylperoxy)silane, dimethylethyl(t-butylperoxy)silane, methyldiethyl(t-butylperoxy)silane, triethyl(t-butylperoxy)silane, dimethylbutyl(t-butylperoxy)silane and methylethylbutyl(t-butylperoxy)silane.

Ingredient (A) can be a single compound or a mixture of 2 or more compounds.

Ingredient (B) of the present compositions is an organosilicon compound having at least 2 silicon-bonded alkoxy groups in each molecule. This ingredient increases the adhesiveness of ingredient (A) significantly when used in combination with ingredient (C), an organotitanate ester.

Ingredient (B) is represented by the average unit formula $R^1{}_aR^2{}_b(OR^3)_cSiO_{(4-a-b-c)/2}$. In this formula $R^1$ represents a substituted or unsubstituted monovalent hydrocarbon radical exclusive of the class represented by $R^2$. Specific examples of $R^1$ include, but are not limited to, alkyl radicals such as methyl, ethyl, propyl and octyl; aryl radicals such as phenyl and these radicals in which at least one hydrogen has been replaced by halogen or the cyano group.

$R^2$ represents a monovalent organic radical containing an addition-reactive or condensation-reactive functional group. Examples of reactive groups are vinyl, allyl, epoxy, methacryloxy, mercapto, amino, N-alkylamino and N-(aminoalkyl)amino. The functional group is bonded to silicon directly or via a divalent organic group such as methylene, ethylene, propylene, phenylene, fluoroethylene, $-CH_2OCH_2CH_2$, $-CH_2CH_2OCH_2CH_2$, $-CH_2OCH_2CH_2OCH_2CH_2-$ and $-(CH_2)_3(NHCH_2CH_2)-_{(1-5)}$. $R^3$ in the foregoing average formula represents an alkyl radical such as methyl, ethyl and propyl; an aryl radical such as phenyl or an alkoxyalkyl radical such as 2-methoxyethyl or 2-ethoxyethyl. The value represented by a and b in the foregoing formula are from 0 to 3, inclusive, the value of c is greater than 0 but no greater than 4 and the sum of a+b+c is greater than 0 but no greater than 4.

Examples of ingredient (B) include tetraalkoxysilanes, organotrialkoxysilanes, diorganodialkoxysilanes, organopolysiloxanes containing at least 2 silicon-bonded alkoxy groups in each molecule and the partial hydrolysis-condensation products of any of these exemplary compounds.

From the standpoints of good bonding and air-dryability, preferred embodiments of ingredient (B) include tetraalkoxyalkoxysilanes and organotrialkoxyalkoxysilanes, wherein each molecule possesses 3 or 4 alkoxyalkyl groups such as 2-methoxyethyl or 2-ethoxyethyl representing $R^3$, and their partial hydrolysis-condensation products.

Ingredient (B) can be a single species or a mixture of 2 or more species. The combination of ingredients (B) and (C) provide a remarkable improvement in the bonding properties of ingredient (A).

The concentration of ingredient (B) in the present compositions is from 5 to 500 parts by weight, preferably from 30 to 150 parts by weight per 100 parts by weight of ingredient (A).

Specific examples of ingredient (B) include, but are not limited to vinyltrimethoxysilane, methylvinyldimethoxysilane, vinyltriethoxysilane, methyltris(β-methoxyethoxy)silane, vinyltris(β-methoxyethoxy)silane, γ-methacryloxypropyl(methyl)dimethoxysilane, γ-methacryloxypropyltriethoxysilane, β-(3,4-epoxycyclohexyl)ethyltrimethoxysilane, γ-aminopropyltriethoxysilane, N-β-aminoethyl-γ-aminopropyltrimethoxysilane, ethyl orthosilicate, methyl Cellosolve orthosilicate and the partial hydrolysis-condensation products of one or more of these silanes and silicates.

The organotitanate ester, identified hereinafter as ingredient (C) of the present compositions, imparts a remarkable improvement in the bonding properties of ingredient (A) when used in combination with ingredient (B) in addition to improving the air-drying properties of the present compositions. Ingredient (C) includes unmodified organotitanate esters, partially alkoxylated partial chelates of titanium, titanium chelate compounds, chelates of titanium derived from silicic acid esters and the partial hydrolysis-condensation products of these compounds.

Specific non-limiting examples of ingredient (C) include tetraisopropyl titanate, tetra-n-propyl titanate, tetrabutyl titanate, tetraacyl titanates, tetra(2-ethylhexyl)titanate, dibutyldiisopropyl titanate, triethanolamine titanate, ethylene glycol titanate, bis(acetylacetonate)-diisopropoxytitanium, tetra(trimethylsiloxy) titanate and the partial hydrolysis-condensation products of these compounds. These titanium compounds can be used individually or in mixtures of 2 or more.

Ingredient (C) is typically used at a concentration of from 0.1 to 50 parts by weight, preferably from 1 to 30 parts by weight, per 100 parts by weight of ingredient (A). The best bonding properties are obtained when weight ratio of ingredient (B) to ingredient (C) is within the range of from 2 to 10.

Ingredient (D) of the present compositions is an organic liquid capable of solubilizing the compositions. It is selected by taking into consideration the solubilities of ingredients (A), (B) and (C) in the organic liquid and the volatility of the liquid when the composition is coated as a primer. Specific, non-limiting examples of ingredient (D) include xylene, benzene, n-hexane, mineral spirits, trichloroethylene, acetone, methyl ethyl ketone and mixtures of 2 or more of these solvents. Mineral spirits, n-hexane, toluene and xylene are most appropriate for dissolving preferred compositions. The amount of solvent is limited only by its function, which is to adjust the viscosity of the composition to a level advantageous for the particular primer coating operation selected.

The present compositions can be prepared by blending the foregoing ingredients (A)-(D) to achieve a homogeneous solution of the desired viscosity. The composition can optionally include other ingredients, including fillers exemplified by fumed silica, precipitated silica, finely divided quartz, diatomaceous earth, calcium carbonate, red iron oxide, alumina and carbon black. Thermal stabilizers and colorants can also be added to improve or modify the physical properties of the cured film.

When used as primers, the present compositions are coated on the substrate and allowed to air-dry for at least 30 minutes before adhering the silicone rubber. Suitable substrates are exemplified by metals such as iron, stainless steel, steel, zinc, nickel, brass and phosphor bronze; plastics such as epoxy resins, polyester resins and polyamide resins; and inorganic materials such as glasses and ceramics. The silicone rubbers that can be bonded to these substrates include thermosetting silicone rubbers and addition-thermosetting silicone rubbers wherein the principal ingredients are an organoperoxide and an organosiloxane homopolymer, copolymer or mixtures of these polymers wherein the repeating units are, for example, dimethylsiloxane, methylvinylsiloxane, methylphenylsiloxane, phenylvinylsiloxane, 3,3,3-trifluoropropylmethylsiloxane, 3,3,3-trifluoropropylvinylsiloxane and/or 3,3,3-trifluoropropylphenylsiloxane. The primer compositions of the present invention are excellent for bonding fluorosilicone rubbers, i.e., those containing a fluorinated hydrocarbon group such as 3,3,3-trifluoropropyl. These rubbers have been particularly difficult to bond using typical primers.

In addition to bonding silicone rubbers to various substrates, the present compositions are also useful for bonding silicone rubbers to one another and for bonding natural and synthetic rubbers to silicone rubbers. The compositions can be applied as a primer as described hereinbefore. Alternatively, the composition can be added to rubbers, resins, paints, and other materials to improve the adhesion of these materials to a variety of substrates.

The following examples describe preferred embodiments of the present compositions and should not be interpreted as limiting the invention defined in the accompanying claims. All parts and percentages in the examples are by weight.

EXAMPLE 1

Six primer compositions were prepared using the types and amounts of ingredients reported in Table 1. Three of these compositions are representative of this invention and three omitted one of the aforementioned ingredients (A), (B) or (C) and are used for comparative purposes. Each of the six compositions were dissolved in 100 parts by weight of mineral spirits. The three compositions of this invention were coated on plates formed from iron, phosphor bronze, brass, nickel and stainless steel. The three comparative compositions were coated only on iron plates. All of the coatings were allowed to air dry for 60 minutes at room temperature. A 4 mm-thick unvulcanized molding of a fluorosilicone rubber compound (SE1570u from Toray Silicone Co., Ltd.), to which 0.5% 2,5-dimethyl-2,5-di(t-butyl peroxy)hexane had been added as a crosslinker, was then placed on the coated surfaces of all plates. The resultant laminates were heated at 170° C. under a pressure of 2.943 megapascals for 10 minutes to simultaneously cure the fluorosilicone rubber and bond it to the metal plates. The cured laminates were then tested for adhesion using the 180° peel test of Japanese Industry Standard (JIS) K-6744 followed by a visual inspection to determine the type of bond failure and, where appropriate, the percentage of total bonded area over which cohesive failure occurred. This was rated using the following scale.

A: 100% cohesive failure
B: 80% cohesive failure
C: 60% cohesive failure
D: thin layer cohesive failure
E: peeling at the interface The primer was coated on a metal plate, air-dried for 60 minutes and the coated surface then examined by touch. A dry surface is scored as 0, a wet and smeary coating is scored as X, and a condition intermediate between these two conditions is scored as *.

The results of the air drying and bonding evaluations are reported in Table 1.

None of the comparative primer compositions formed an acceptable cohesive bond between the rubber and the iron plate. This demonstrates the requirement for a combination of ingredients (A), (B) and (C) to achieve cohesive bonding between the rubber and the substrate.

TABLE 1

| | | experiment number | | | | | |
|---|---|---|---|---|---|---|---|
| | | present invention | | | comparison examples | | |
| Ingredients | | 1 | 2 | 3 | 1 | 2 | 3 |
| (A) | | | | | | | |
| trimethyl(t-butyl peroxy)silane | (parts) | 100 | 100 | 100 | 100 | — | 100 |
| (B) | | | | | | | |
| methyl Cellosolve orthosilicate* | (parts) | 30 | 30 | 30 | 30 | 30 | — |
| (C) | | | | | | | |
| tetrabutyl titanate | (parts) | 2 | 10 | 30 | — | 10 | 10 |

TABLE 1-continued

| | experiment number | | | | | |
|---|---|---|---|---|---|---|
| | present invention | | | comparison examples | | |
| Ingredients | 1 | 2 | 3 | 1 | 2 | 3 |
| bonding evaluation | | | | | | |
| iron | A | A | B | D | E | D |
| stainless steel | A | A | C | — | — | — |
| nickel | C | B | C-D | — | — | — |
| brass | B | A | C | — | — | — |
| phosphor bronze | A | A | C | — | — | — |
| air-dryability of primer | * | O | O | x | * | O |

*$(CH_3OCH_2CH_2O)_4Si$

EXAMPLE 2

This example demonstrates the operability of 3 titanium compounds as ingredient (C) of the present compositions.

Three primer compositions of this invention were prepared using the 3 organotitanate compounds listed in Table 2. The bonding and air-drying properties of the primers were evaluated as described in Example 1 using the same unvulcanized fluorosilicone rubber and metal plates. 100 parts mineral spirits were used as the organic solvent for each sample. The results are reported in Table 2. Bonding between the rubber and substrate was considered excellent for all compositions tested.

TABLE 2

| | | experiment number present invention | | |
|---|---|---|---|---|
| Ingredients | | 4 | 5 | 6 |
| (A) | trimethyl(t-butyl peroxy)silane (parts) | 100 | 100 | 100 |
| (B) | methyl Cellosolve orthosilicate (parts) | 30 | 30 | 30 |
| (C) | dibutyl- diisopropyl titanate (parts) | 10 | — | — |
| | tetraisopropy titanate (parts) | — | 10 | — |
| | butyl titanate dimer (parts) | — | — | 10 |
| bonding evaluation | | | | |
| iron | | A | A | A |
| stainless steel | | A | A | A |
| nickel | | B | B | B |
| brass | | A | A | A |
| phosphor bronze | | A | A | A |
| air-dryability of primer | | O | O | O |

EXAMPLE 3

This example demonstrates compositions of this invention containing vinyltrimethoxysilane and n-propyl orthosilicate as ingredient (B).

Two primer compositions were prepared using 100 parts mineral spirits for each sample together with the types and amounts of ingredients reported in Table 3. The compositions were coated as thin films on the same metal plates as described in Example 1 and allowed to air-dry at room temperature for 60 minutes. An addition-curable liquid silicone rubber (SE 6706 from Toray Silicone Co., Ltd.) was then poured over the film and then cured at 150° C. under ambient pressure for 10 minutes. The type of bonding achieved was evaluated using the method described in Example 1.

TABLE 3

| Ingredients | | | experiment number present invention | |
|---|---|---|---|---|
| | | | 7 | 8 |
| (A) | trimethyl(t-butyl peroxy)silane | (parts) | 100 | 100 |
| (B) | vinyltrimethoxy- silane | (parts) | 60 | — |
| | n-propyl ortho- silicate | (parts) | — | 60 |
| (C) | tetrapropyl titanate | (parts) | 20 | 20 |
| bonding evaluation | | | | |
| iron | | | A | A |
| stainless steel | | | A | B |
| nickel | | | B | B |
| brass | | | A | B |
| phosphor bronze | | | A | B |
| air-dryability of primer | | | O | O |

EXAMPLE 4

This example demonstrates the adhesion achieved using primer compositions of this invention containing gamma-methacryloxypropyltrimethoxysilane and a partial hydrolyzate thereof as ingredient (B) and a chelated titanium compound as ingredient (C).

Two primer compositions of this invention were prepared using the types and amounts of ingredients reported in Table 4. The compositions were then dissolved in 100 parts mineral spirits. The degree of bonding was evaluated using the rubber, substrates and method described in Example 1.

TABLE 4

| Ingredients | | experiment number present invention | |
|---|---|---|---|
| | | 9 | 10 |
| (A) | trimethyl(t-butyl peroxy)silane (parts) | 100 | 100 |
| (B) | gamma-methacryloxypropyl-trimethoxysilane (parts) | 30 | — |
| | partial hydrolysis-condensation product of gamma-methacryloxypropyl-trimethoxysilane (parts) | — | 30 |
| (C) | bis(acetylacetonate)-diisopropoxytitanium (75% isopropyl alcohol solution) (parts) | 10 | 10 |
| bonding evaluation | | | |
| iron | | A | A |
| stainless steel | | B | A |
| nickel | | C | B |
| brass | | B | A |
| phosphor bronze | | B | A |
| air-dryability of primer | | O | O |

EXAMPLE 5

This example demonstrates the bonding achieved using primers wherein a peroxy substituted silane of this invention is replaced with an organic peroxide or with vinyl tris(t-butylperoxy)silane, a known primer.

One primer composition of this invention and three comparative compositions were prepared using the types and amounts of ingredients listed in Table 5. Each composition included 100 parts of mineral spirits as a solvent. The bonding between rubber and substrate was evaluated using the same unvulcanized fluorosilicone rubber, metal plates and procedure described in Example 1.

The data in Table 5 demonstrate that the adhesion achieved using the combination of a compound representative of ingredient (B) of the present compositions and a titanium compound is equivalent to the adhesion achieved using a composition containing a prior art ethylenically unsaturated peroxy silane. The data in Table 1 demonstrate the unacceptable adhesion obtained using a peroxysilane of this invention in the absence of a compound corresponding to ingredient (B) or (C).

TABLE 5

| Ingredients | | present invention | comparison examples | | | |
|---|---|---|---|---|---|---|
| | | 11 | 4 | 5 | 6 | 7 |
| (A) | | | | | | |
| dimethyldi(t-butyl peroxy)silane | (parts) | 100 | — | — | — | — |
| dicumyl peroxide | (parts) | — | 100 | — | — | — |
| t-butyl perbenzoate | (parts) | — | — | 100 | — | — |
| 2,5-dimethyl-2,5-di-(t-butyl peroxy)-hexane | (parts) | — | — | — | 100 | — |
| vinyltris(t-butyl peroxy silane | (parts) | — | — | — | — | 100 |
| (B) | | | | | | |
| methyl Celloslove orthosilicate | (parts) | 30 | 30 | 30 | 30 | 30 |
| (C) | | | | | | |
| tetrabutyl titanate | (parts) | 10 | 10 | 10 | 10 | 10 |
| bonding evaluation | | | | | | |
| iron | | A | C | C | B | A |
| stainless steel | | A | C | D | C | A |
| nickel | | B | D | D | D | B |
| brass | | A | C | C | B | A |
| phosphor bronze | | A | D | D | D | A |

That which is claimed is:

1. A primer composition for bonding a silicone rubber composition to a substrate, said composition comprising
   A. 100 parts by weight of a silane of the formula $R_nSi[OCC(CH_3)_3]_{4-n}$ 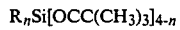

where R represents alkyl containing from one to four carbon atoms, aryl, substituted alkyl where the alkyl portion contains from one to four carbon atoms, or substituted aryl where the substituent is halogen and n is 1, 2 or 3;
   B. from 5 to 500 parts by weight of an organosilicon compound containing at least two alkoxy groups per molecule and at least one unit corresponding to the average formula $R^1_aR^2_b(OR^3)_cSiO_{(4-a-b-c)/2}$ 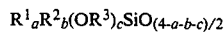

where $R^1$ is methyl, ethyl, aryl, substituted methyl, substituted ethyl or substituted aryl where the substituent is a halogen or a cyano group $R^2$ represents a monovalent radical containing a functional group selected from the group consisting of vinyl, allyl, epoxy, methacryloxy, mercapto, amino and N-aminoalkyl), where said functional group is bonded to silicon directly or by means of a divalent hydrocarbon radical; $R^3$ is methyl, ethyl, propyl, phenyl, 2-methoxyethyl or 2ethoxyethyl, the value of a is from 0 to 3, inclusive, the value of b is from 0 to 3, inclusive, the value of c is greater than 0 and no greater than 4 and the sum of a+b+c is greater than 0 and no greater than 4;

C. from 0.1 to 50 parts by weight of an organotitanate ester; and

D. an organic liquid in an amount sufficient to solubilize said primer composition.

2. A composition according to claim 1 where the functional group present on $R^2$ is bonded to silicon directly or by means of a divalent hydrocarbon radical; and ingredient (D) is a liquid hydrcarbon or a liquid chlorinated hydrcarbon.

3. A composition according to claim 2 where ingredient (B) is a silane wherein the value of c in said average formula is 2, 3, or 4, a partial hydrolysis product of said silane, a mixture of said silane and said hydrolysis product, or a polyorganosiloxane containing at least two silicon-bonded alkoxy groups per molecule.

4. A composition according to claim 3 where R is alkyl containing from one to four carbon atoms, $R^1$ is methyl or ethyl, $R^2$ is vinyl, allyl, gamma-methacryloxypropyl, gamma-glycidoxyropyl or N-(beta-aminoethyl)-gamma-aminopropyl, $R^3$ is methyl, ethyl, propyl or methoxyethyl, a is 0 or 1, b is 0 or 1, and c is from 1 to 4, inclusive.

5. A composition according to claim 4 where ingredient (A) is methyl tris(t-butyl peroxy)silane; ingredient (B) is tetra(2-methoxyethoxy)silane, vinyltrimethoxysilane, n-propylorthosilicate, gamma-methacryloxypropyltrimethoxysilane or a partial hydrolyzate of gamma-methacryloxypropyltrimethoxysilane and is present at a concentration of from 30 to 150 parts by weight per 100 parts of ingredient (A); ingredient (C) is selected from tetrabutyl titanate, dibutyltitanate dimer, tetrapropyl titanate and bis(acetylacetonate)diisopropyltitanium, ingredient (D) is mineral spirits, and the weight ratio of ingredient (B) to ingredient (C) is from 2 to 10, inclusive.

* * * * *